United States Patent [19]

Baron et al.

[11] Patent Number: 5,346,978

[45] Date of Patent: * Sep. 13, 1994

[54] POLYMERIC COMPOSITIONS USEFUL IN OXYGEN PERMEABLE CONTACT LENSES

[75] Inventors: Richard C. Baron, Tewksbury, Mass.; Scott D. Rothenberger, Derry, N.H.

[73] Assignee: Polymer Technology Corporation, Wilmington, Mass.

[*] Notice: The portion of the term of this patent subsequent to Jul. 16, 2008 has been disclaimed.

[21] Appl. No.: 84,398

[22] Filed: Jun. 29, 1993

Related U.S. Application Data

[60] Continuation of Ser. No. 958,663, Oct. 8, 1992, abandoned, which is a continuation of Ser. No. 851,873, Mar. 16, 1992, Pat. No. 5,177,168, which is a continuation of Ser. No. 697,112, May 8, 1991, abandoned, which is a division of Ser. No. 422,612, Oct. 17, 1989, Pat. No. 5,032,658.

[51] Int. Cl.$^5$ ............................................. C08F 22/10
[52] U.S. Cl. ..................... 526/321; 526/242; 526/245; 526/247; 526/279; 526/318; 526/325; 526/328.5
[58] Field of Search ............... 526/321, 242, 245, 247, 526/279, 318, 325, 328.5; 350/409

[56] References Cited

U.S. PATENT DOCUMENTS

| | | |
|---|---|---|
| 3,923,752 | 12/1975 | Guse et al. ............................ 526/321 |
| 4,152,508 | 5/1979 | Ellis et al. ............................ 526/279 |
| 4,327,203 | 4/1982 | Deichert et al. . |
| 4,433,125 | 2/1984 | Ichinohe et al. ..................... 526/279 |
| 4,508,884 | 4/1985 | Wittmann et al. . |
| 4,536,267 | 8/1985 | Ito et al. . |
| 4,602,074 | 7/1986 | Mizutani et al. ..................... 526/245 |
| 4,868,260 | 9/1989 | Kawaguchi ........................ 526/242 |
| 5,032,658 | 7/1991 | Baron et al. ........................ 526/321 |

FOREIGN PATENT DOCUMENTS

| | | |
|---|---|---|
| 0277771 | 1/1988 | European Pat. Off. . |
| 61-241305 | 10/1986 | Japan . |
| 837719 | 6/1960 | United Kingdom ............... 526/321 |

*Primary Examiner*—Joseph L. Schofer
*Assistant Examiner*—N. Sarofim
*Attorney, Agent, or Firm*—Craig E. Larson

[57] ABSTRACT

Carboxylic acid esters devoid of beta hydrogens are homopolymerized or copolymerized with contact lens organic materials to form desirable contact lens materials and contact lenses. These materials have good contact lens properties, including desirable DK values, hardness, machineability and a desirable refractive index of at least 1.

16 Claims, No Drawings

POLYMERIC COMPOSITIONS USEFUL IN OXYGEN PERMEABLE CONTACT LENSES

This is a continuation of copending application Ser. No. 07/958,663 filed on Oct. 8, 1992, now abandoned, which is a continuation of Ser. No. 851,873 filed Mar. 16, 1992, U.S. Pat. No. 5,177,168, which is a continuation of Ser. No. 697,112 filed May 8, 1991, abandoned, which is a division of Ser. No. 422,612 filed Oct. 17, 1989, U.S. Pat. No. 5,032,658.

BACKGROUND OF THE INVENTION

Siloxane based materials are often prepared by copolymerization of a siloxanyl alkyl ester of methacrylic acid with other acrylate, methacrylate or itaconate monomers in many known formulations. Such compositions can exhibit excellent oxygen permeability, due in large measure to the use of the siloxane material. It is desirable to increase the siloxane content in order to increase oxygen permeability. However, such increase often decreases hardness values, sometimes giving difficulty in machineability, dimensional stability, and other values.

The art has recognized that introducing fluorine containing groups into contact lens polymers can also significantly increase oxygen permeability. These materials can range from soft to semi-rigid and often require the use of special wetting agents or surface treatments. Siloxanes, on the other hand, which increase oxygen permeability, sometimes have problems with biocompatibility and protein buildup.

Other contact lenses are known which are based on telechelic perfluorinated polyethers. Such lenses can have good oxygen permeability, but are often relatively soft; sometimes causing difficulty in using conventional machine techniques known to the art.

Still other contact lenses having good oxygen permeability have resulted from various mixtures and copolymerized materials of organosiloxanes and fluorinated components, as in U.S. Pat. No. 4,433,125. Here again, the materials sometimes exhibit low levels of hardness.

In many of the above contact lens materials, methacrylates, acrylates and itaconates are used to increase hardness, while still retaining optical properties which are necessary for contact lens use.

In general, oxygen permeability has often been increased in hard or rigid gas permeable contact lenses in the past, by the addition of silicone and/or fluorine-containing materials which often require the use of hardening agents in order to maintain hardness values desired.

SUMMARY OF THE INVENTION

According to the invention, a contact lens material is formed from the free radical polymerization of a contact lens organic material and a carboxylic acid ester devoid of beta hydrogens, wherein the carboxylic acid ester can have a hardness of at least 70 Shore D when homopolymerized and a DK of at least 10 at a number average molecular weight of 50,000 or above, and acts to avoid substantial decrease in the oxygen permeability of the contact lens organic material. In some cases, there is a decrease in the DK as compared to the DK of siloxanes alone, but the decrease is substantially less than would occur by use of conventional hardening agents such as methylmethacrylate.

The carboxylic acid ester, useful in the present invention, can be copolymerized with other organic contact lens materials, or can be substantially homopolymerized by free radical polymerization to produce a homopolymer having acceptable contact lens values for DK and overall hardness, machineability and handling properties, including compatibility with the eye of the wearer. Neopentyl itaconate and neopentyl methacrylates are preferred materials for use as a homopolymer contact lens and for use in copolymerization with other contact lens organic monomers.

Preferably, the polymerizable carboxylic acid esters useful in this invention are esters having the following formula:

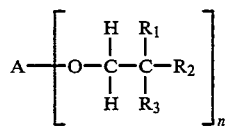

wherein A is selected from the group consisting of mesaconic acid, itaconic acid, citraconic acid, ethyl tricarboxylic acid, methylene malonate, maleic acid, fumaric acid, acrylic acid, and methacrylic acid, n=1, 2 or 3, $R_1$, $R_2$ and $R_3$ are the same or different and each are alky, cycloalkyl or aryl groups having from 1 to 10 carbon atoms or ether groups having from 2 to 10 carbon atoms, where when A is derived from a dibasic or tribasic acid, the ester can be a full ester, half ester, partial ester, or a mixed ester, but said ester is derived from at least one alcohol which is devoid of beta hydrogens, p1 said lens having a Shore D hardness of at least 70 and a DK of at least 10.

Preferably, the contact lens organic material with which the carboxylic acid ester is mixed, is an organic material selected from the group consisting of silicone acrylates, fluorosilicone acrylates, fluoroacrylates, hema type polymers, fluoropolyethers, styrene materials and mixtures thereof.

Neopentyl fumarate and neopentyl maleate are new compositions which have been found useful as contact lens materials, as homopolymers or intermixed with other materials in copolymer forms.

A contact lens is formed by a method wherein the hardness and DK value of the contact lens material is modified by copolymerizing the carboxylic acid ester of this invention, having no beta hydrogens with at least one contact lens monomer to obtain a desirable hardness and DK, wherein the copolymerization is carried out by intermixing the monomers and ester and then polymerizing under free radical conditions.

It is a feature of this invention that useful hardness can be increased or maintained in mixed organic resins useful as contact lens materials, while avoiding detraction from the DK values of such mixtures. Overall density of contact lenses can be lowered. The esters used can add to the DK value of materials, including siloxane material, and when homopolymerized, provide hard, useful contact lenses having useful DK values of at least 15 in polymers formed by free radical polymerization and having a number average molecular weight of at least 50,000.

Contact lenses made in accordance with this invention can have good contact lens properties, including a refractive index of at least 1, good hardness, stiffness, machineability and other properties. They can be modified by conventional contact lens modifiers to obtain desirable wettability and protein resistance or other desirable contact lens properties known in the art.

It is an object of this invention to provide a contact lens material which can be copolymerized with other contact lens materials to produce desirable contact lens materials which have good optical and workability properties, including good machineability, acceptable hardness and DK values, along with compatability in use in the eye.

Still another object of this invention is to provide substantially homopolymerized carboxylic acid ester polymers which are devoid of beta hydrogens and have substantial hardness with desired oxygen permeability values, along with other good contact lens properties.

Still another object of this invention is to provide carboxylic acid esters which can be copolymerized with other contact lens materials, including siloxanes and others, to increase hardness values while maintaining or increasing DK values of copolymerized materials.

Still another object of this invention is to provide a method of advantageously modifying properties of a contact lens material by incorporating therein a carboxylic acid ester of this invention.

Still another object of this invention is to provide novel carboxylic acid ester materials for use in contact lenses.

DESCRIPTION OF PREFERRED EMBODIMENTS

Generally, the carboxylic acid esters useful as homopolymers or in admixture with conventional contact lens organic materials of this invention are generally esters that are bulky, that is, they have a free volume greater than the free volume of the isopropyl group and are branch or ring structures. Such esters, surprisingly, have been found to increase the oxygen permeability of contact lens materials, while providing hardness values where desired.

Often, the use of such esters can result in materials having improved comfort in the eye, good surface properties and, in some cases, thinner lenses are possible because of the increased hardness. For example, by using neopentyl methacrylate homopolymerized, harder, thinner lenses can be used, having DK's of preferably at least 15.

The carboxylic acid esters of this invention preferably have the following formula:

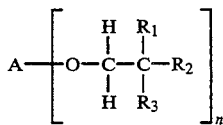

wherein:
A is selected from the group consisting of mesaconic acid, itaconic acid, citraconic acid, methylene malonic acid, maleic acid, fumaric acid, ethylene tricarboxylic acid, acrylic acid, and methacrylic acid,
$R_1$, $R_2$ and $R_3$ are the same or different and each are alky, cycloalkyl or aryl groups having from 1 to 10 carbon atoms or ether groups having from 2 to 10 carbon atoms,
n=1,2 or 3,
where when A is derived from a dibasic or tribasic acid, the ester can be a full ester, half ester, partial ester, or can be a mixed ester, said ester being derived from at least one alcohol which is devoid of beta hydrogens, Preferably, homopolymerized esters have a Shore D hardness of at least 70 and a DK of at least 10 when polymerized by free radical polymerization to have a number average molecular weight of at least 50,000.

Examples of specific carboxylic acid esters useful in this invention include esters having no beta hydrogens and derived from tribasic carboxylic acids such as ethylene tricarboxylate, dibasic carboxylic acids such as mesaconates, citraconates, maleates, fumarates and homobasic carboxylic acids such as acrylates and methacrylates. Such esters include,
dineopentyl fumarate
dineopentyl itaconate
dineopentyl mesaconate
dineopentyl citraconate
dineopentyl methylene malonate
dineopentyl maleate
neopentyl methacrylate
neopentyl acrylate
mono-neopentyl fumaric acid
mono-neopentyl methylene malonic acid
mono-neopentyl maleic acid
mono-neopentyl itaconic acid
mono-neopentyl mesaconic acid
mono-neopentyl citraconic acid
methyl neopentyl itaconate
t-butyl, neopentyl itaconate
t-butyl, neopentyl fumarate
t-butyl, neopentyl mesaconate
t-butyl, neopentyl citraconate
t-butyl, neopentyl methylene malonate
t-butyl, neopentyl maleate
trineopentyl ethylene tricarboxylate
neopentyl di-t-butyl ethylene tricarboxylate
dineopentyl, t-butyl ethylene tricarboxylate
neopentyl, t-butyl ethylene tricarboxylate.

When contact lenses are formed substantially from homopolymers, in accordance with this invention, homopolymers of methacrylates, itaconates and fumarates have been found particularly useful.

When the carboxylic acid esters of this invention are used as homopolymers, or substantial homopolymers, in making contact lenses, they may have incorporated therein, wetting agents, crosslinking agents, permeability enhancers, and physical property modifiers, as known in the art.

In most cases, the carboxylic acid esters of this invention are preferably used as modifiers to other contact lens materials. Often they are used as modifiers in places where methylmethacrylate and similar itaconates, acrylates and methacrylates had been used in the past as hardening agents. However, in this case, they can provide hardening equivalent to that provided by the hardener while increasing the DK values otherwise obtained.

When the carboxylic acid esters of this invention are compounded with other organic materials to form contact lens materials or contact lenses directly, such materials include, but are not limited to, silicone acrylate materials, fluorosilicone acrylate materials, fluoroacrylate materials, hema type materials, fluoropolyethers and styrene type materials. Often the carboxylic acid esters of this invention are less than 50% of the final formulations. Monomer mixtures are used with free radical polymerization to form copolymeric materials.

Overall DK's of at least 10 are preferred when the carboxylic acid esters are used as the major component of a contact lens material and at least a DK of 20 when admixed with other materials. DK's of 30 or above are preferred, along with Shore D values of hardness of at least 70, and preferably at least 80. Rockwell hardness values of 100 are preferred when combined with other materials, with all Rockwell hardness values being measured by ASTMD-785.

The silicone acrylates, when used with the carboxylic acid esters of this invention, include

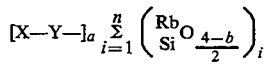

Wherein:

"X" the ethylenically unsaturated group is chosen from among:
vinyl
acryloxy
methacryloxy
vinyloxy
carbovinyloxy "Y" the divalent radical is either no group or
methylene
ethylene
propylene
propenylene
butylene
cyclohexylene
phenylene
—CH$_2$CH(OH)CH$_2$OCH$_2$CH$_2$CH$_2$—
—CH$_2$CH$_2$OCH$_2$CH(OH)CH$_2$OCH$_2$CH$_2$CH$_2$—

"a" is an integer from 1 to 4
"n" is an integer from 4 to 20
"b" is an integer from 0 to 3 and may be the same or different for each "i" group
"R" may be the same or different within each "i" moiety and is selected from among:
vinyl
methyl
ethyl
propyl
butyl
cyclohexyl
phenyl
2-acetoxyethyl
3-acetoxypropyl
2-(carbomethoxy) ethyl
3-(carbomethoxy) propyl
3-hydroxypropyl
4-hydroxybutyl
3,3,3,-trifluoropropyl
3-(heptafluoroisopropoxy) propyl
pentafluorophenyl Specific acrylate and methacrylate functional alkyl-/aryl siloxanes as described in the following U.S. patents may also be used; U.S. Pat. Nos. 3,808,178; 4,120,570; 4,216,303; 4,242,483; 4,248,989; 4,303,772; 4,314,068; 4,139,513; 4,139,692; 4,235,985; 4,153,641; 4,276,402; 4,355,147; 4,152,508; 4,424,328; 4,450,264.

Such examples include:
pentamethyldisiloxanylmethyl acrylate and methacrylate
heptamethyltrisiloxanylethyl acrylate and methacrylate
phenyltetramethyldisiloxanylethyl acrylate and methacrylate
triphenyldimethyldisiloxanylmethyl acrylate and methacrylate
isobutylhexamethyltrisiloxanylmethyl acrylate and methacrylate
n-Propyloctamethyltetrasiloxanylpropyl acrylate and methacrylate
methyldi(trimethylsiloxy) silylmethyl acrylate and methacrylate
dimethyl [bis(trimethylsiloxy)methyl siloxanyl] silyl methyl acrylate and methacrylate
dimethyl [tris(trimethylsiloxy) siloxanyl] silylpropyl acrylate or methacrylate
tris(trimethylsiloxy)silymethyl acrylate and methacrylate
tris(trimethylsiloxy)silylpropyl acrylate and methacrylate
tris(phenyldimethylsiloxy)silylpropyl acrylate and methacrylate
t-Butyldimethylsiloxy[bis(trimethylsiloxy)] silylpropyl acrylate and methacrylate
tris(pentamethyldisiloxanyl) silylpropyl acrylate and methacrylate
tris[tris(trimethylsiloxy)siloxanyl] silylpropyl acrylate and methacrylate
tris[bis(trimethylsiloxy)methylsiloxanyl] silylpropyl acrylate and methacrylate
methylbis (trimethylsiloxy)-silylpropylglycerol acrylate and methacrylate
tris(trimethylsiloxy)silylproplylglycerol acrylate and methacrylate
methylbis(trimethylsiloxy)-silylpropylglycerolethyl acrylate and methacrylate
tris(trimethylsiloxy)silylpropylglycerolethyl acrylate and methacrylate
1,3-bis(methacryloxypropyl) tetrakis (trimethylsiloxy) disiloxane
1,5-bis(methacryloxymethyl)3,3-bis(trimethylsiloxy) tetramethyl trisiloxane
1,3-bis(4-methacryloxybutyl)tetramethyldisiloxane
alpha,omega-bis(4 methacryloxybutyl) polydimethyl siloxane
1,5-bis(methacryloxypropyl) 1,1,5,5 tetrakis (trimethylsiloxy) dimethyltrisiloxane
1,3-bis(methacryloxypropyl)tetrakis[bis (trimethylsiloxy) methylsiloxanyl] disiloxane
1,7-bis(methacryloxypropyl)octa(trimethylsiloxy) tetrasiloxane
tris(methacryloxypropyltetramethyldisiloxanyl) trimethylsiloxysilane
8-(3-hydroxy-4-methacryloxycyclohexyl)ethyltris (trimethylsiloxy)silane
2-hydroxy-4-tris(trimethylsiloxy)silylcyclohexyl methacrylate Acrylate and methacrylate functional, substituted alkyl/aryl siloxanes such as those described in U.S. Pat. No. 4,463,149 can be used;

Typical examples include:
tris(2-acetoxyethyldimethylsiloxy)silylpropyl acrylate and methacrylate
tris(2-carboxyethyldimethylsiloxy)silylpropyl acrylate and methacrylate
tris(3-hydroxypropyldimethylsiloxy)silylpropyl acrylate and methacrylate
acrylate and methacrylate functional, fluorosubstituted alkyl/aryl siloxanes such as:

tris(3,3,3 trifluoropropyl dimethylsiloxy) silyl propyl acrylate and methacrylate tris[3-heptafluoroisopropoxy propyl)] dimethylsiloxy silylpropyl acrylate and methacrylate tris(pentafluorophenyl dimethylsiloxy)silyl propyl acrylate and methacrylate Other potentially useful ethylenically unsaturated organosiloxanes include:

p-(pentamethyldisiloxanyl) styrene bis(trimethylsiloxy)

pyrrolidinonyldimethyl siloxy-silylpropyl acrylate and methacrylate.

The ethylenically unsaturated organosiloxane used or mixture thereof can be a monofunctional organosiloxane. Preferably, however, the organosiloxanes used are mixtures containing multi-functional as well as monofunctional organosiloxanes as set forth in U.S. Pat. No. 4,424,328 issued Jan. 3, 1984. The use of the multifunctional component can provide compositions with increased strength, reduced brittleness while retaining desirable properties of contact lenses. Preferably the organosiloxanes used in the monomeric mixtures of this invention for polymerization include one or more monofunctional organosiloxanes in an amount of from 70 to 95% by weight of the total organosiloxane and one or more multifunctional organosiloxanes in an amount of from about 5 to 30 percent.

Useful multifunctional components can be dimers, trimers or higher functionality organosiloxanes. The terms dimers and trimers are used in the art as recognized usage for difunctional and trifunctional organosiloxane.

The above silicone acrylates, or other silicone acrylate polymeric contact lens materials can be further admixed with fluorine-containing acrylates or itaconates which have been fluorinated, as set forth in U.S. Pat. No. 4,686,267.

Other fluorosilicone acrylates useful in the organic materials of this invention include those disclosed in U.S. Pat. No. 3,808,179, prepared by copolymerizing fluoroalkyl acrylates and methacrylates with alkyl acrylates and methacrylates.

The fluoroalkyl ester comonomers used to prepare the copolymers of the invention have the structural formula

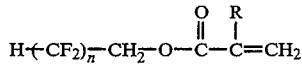

wherein X is selected from the class consisting of hydrogen and fluorine, R is selected from the class consisting of hydrogen and methyl groups, and n is an integer from 1 to 17.

The comonomers which form the copolymer used in the practice of the invention are esters of acrylic and methacrylic acids with an alkanol having from 1 to 20 carbon atoms.

Representative fluoroalkyl ester comonomers include both 1,1-dihydro compounds of the structure

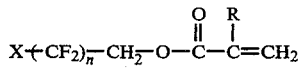

and 1,1-trihydro compounds of the structure

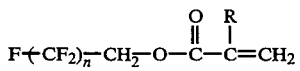

wherein R and n have the meanings previously assigned.

Representative fluoroalkyl acrylic esters include acrylic, methacrylic, fumaric and itaconic acid esters of
1,1-dihydrofluoropropanol,
1,1-dihydrofluorobutanol,
1,1-dihydrofluoropentanol,
1,1-dihydrofluorohexanol,
1,1-dihydrofluoroheptanol,
1,1-dihydrofluorooctanol,
1,1-dihydrofluorononanol,
1,1-dihydrofluorodecanol,
1,1-dihydrofluoroundecanol,
1,1-dihydrofluorododecanol,
1,1-dihydrofluorotridecanol,
1,1-dihydrofluorotetradecanol,
1,1-dihydrofluroropentadecanol,
1,1-dihydrofluorohexadecanol,
1,1-dihydrofluorooctadecanol,
1,1,3-trihydrofluoropropanol,
1,1,4-trihydrofluorobutanol,
1,1,5-trihydrofluoropentanol,
1,1,6-trihydrofluorohexanol,
1,1,7-trihydrofluoroheptanol,
1,1,8-trihydrofluorooctanol,
1,1,9-trihydrofluorononanol,
1,1,10-trihydrofluorodecanol,
1,1,11-trihydrofluoroundecanol,
1,1,12-trihydrofluorododecanol,
1,1,13-trihydrofluorotridecanol,
1,1,14-trihydrofluorotetradecanol,
1,1,15-trihydrofluoropentadecanol,
1,1,16-trihydrofluorohexadecanol,
1,1,17-trihydrofluoroheptadecanol,
1,1,18-trihydrofluorooctadecanol,
1,1,1,3,3,3-hexafluoroisopropanol,
2,2,2-trifluoroethanol.

Hema type material useful in this invention include polymers of the type disclosed in U.S. Pat. No. 4,130,706, having repeating units of the following structure:

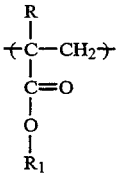

wherein —R is selected from the class consisting of —H and —CH₃ and —R₁ is a group containing 2 to 10 carbon atoms and containing at least one polar group. Generally, it is preferred that —R be —CH₃ because any residual traces of monomer are more irritating when —R is —H. The preferred —R₁ is —CH₂)$_m$OH wherein m is an integer from 2 to 4. The case where —R₁ is —CH₂CH₂OH is especially preferred.

Fluoroacrylates useful as copolymers in this invention include copolymers of methyl methacrylate and certain fluoroesters, which are copolymerizable with methyl methacrylate, specifically those fluoroesters selected from the group consisting of perfluoroalkyl alkyl methacrylates of the formula,

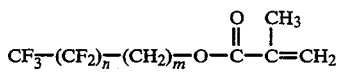

where n is an integer of from 1 to 13, and m is 1 or 2, and telomer alcohol methacrylates of the formula

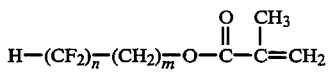

where n is an integer of from 1 to 13 and m is 1 or 2. The following fluoroesters which are copolymerizable with methyl methacrylate have been found to be particularly useful in this context: perfluoroalkyl ethyl methacrylates of the formula

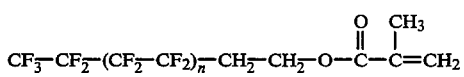

preferably perfluoro-n-hexyl ethyl methacrylate which has the formula

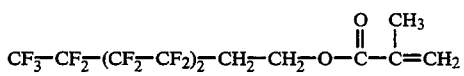

and perfluoroalkyl methyl methacrylates of the formula

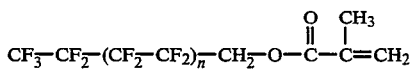

preferably perfluoro-n-hexyl methyl methacrylate which has the formula

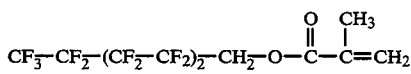

telomer alcohol methacrylates of the formula

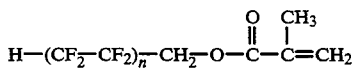

mixtures thereof where, in each case, n is an integer of from 1 to 5.

Styrene type materials useful in this invention include homopolymers or copolymers in which at least one of the comonomers is selected from an alkyl styrene monomer having at least one $C_1$ or higher alkyl group on the aromatic ring and an oxygen permeability constant of at least 10.

The alkyl substituents are selected from $C_1$ or higher; preferably $C_1$-$C_{12}$ alkyl groups which may be the same or different on any of the ring positions from 2 to 6. In brief, the aromatic ring can be mono, di, or tri-substituted on any position in the ring; i.e., with the same or a mixture of the noted groups.

While, as noted above, $C_1$ and higher alkyl substituted polymers form suitable lenses, these lenses made using $C_2$ and higher alkyl groups are preferred because of their superior gas permeability properties. Nevertheless, lenses made with $C_1$ substituents, such as methyl styrene and dimethyl styrene, when treated to improve their surface wettability as described herein, are lenses which are substantially superior in terms of gas permeability and patient comfort over many lenses of the prior art.

Specific examples of styrenes substituted on the ring are methyl styrene (vinyl toluene), ethyl styrene, propyl styrene, butyl styrene, n-butyl styrene, t-butyl styrene, hexyl styrene, n-octyl styrene, t-octyl styrene, decyl styrene, dodecyl styrene, 2,5 dimethyl styrene, 2,6 dimethyl styrene, 2,4,6 trimethyl styrene, and 2,5 diethyl styrene. The foregoing examples are illustrative of suitable substituted styrenes, but are not intended to limit the scope of the invention. Of all the polymers, at the present time, it is believed that the most suitable styrene type polymers for use with the carboxylic acid esters of this invention, with respect to gas permeability and other desirable contact lens properties, are polymers wherein the principal monomers used are t-butyl styrene or isopropyl styrene.

Olefinically unsaturated polymerizable monomers may be copolymerized with the alkyl styrene monomers to give copolymers with specific properties. Said olefinically unsaturated monomers may be of the hydrophobic or hydrophilic types.

Fluoropolyethers of the type disclosed in U.S. Pat. No. 4,440,918 can be used as a conventional contact lens polymeric material which can be modified by the carboxylic acid esters of this invention. Such materials comprise polymers of compositions containing up to 100 percent of telechelic polyether having a backbone of perfluorooxyalkylene units, a number average molecular weight between about 500 and 15,000, and at least one polymerizable ethylenically unsaturated group.

Such polymers preferably comprise a telechelic perfluoropolyether that has a backbone having a number average molecular weight between about 500 and 15,000 and has the formula

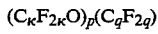

wherein p represents the number of —$C_kF_{2k}O$— subunits in said backbone and is an integer of from 3 to 200; q is an integer of from 1 to 4; and k may be the same or different within each of said —$C_kF_{2k}O$— subunits and is an integer of from 1 to 4. The —$C_kF_{2k}O$— and —$C_qF_{2q}$— subunits are randomly distributed in the backbone.

Wetting agents can be used in amounts from 0.1 to 15 percent by weight of the polymeric mixtures and include:
N-vinylpyrrolidone
acrylamides
methacrylamide
N,N-dimethylacrylamide
2-hydroxyethyl acrylate or methacrylate
2- or 3-hydroxypropyl acrylate or methacrylate
glyceryl acrylate or methacrylate
glycidyl acrylate or methacrylate
3-methoxy-2-hydroxypropyl acrylate or methacrylate
ester derivatives of acrylic, methacrylic and itaconic acid with polyethers of the general formula:

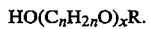

Wherein "n" is a number from 1 to about 4 and "x" is a number from 2 to about 10 and "R" is hydrogen or a lower alkyl group.

The cationic hydrophilic monomers either can be initially in their charged form or are subsequently converted to their charged form after formation of the contact lens. The classes of these compounds are derived from basic or cationic acrylates, methacrylates, acrylamides, methacrylamides, vinylpyridines, vinylimidazoles, and diallyldialkylammonium polymerizable groups. Such monomers are represented by:
N,N-dimethylaminoethyl acrylate and methacrylate
2-methacryloyloxyethyl trimethyl ammonium chloride and methylsulfate
2-,4-, and 2-methyl-5-vinylpyridine
2-,4-, and 2-methyl-5-vinylpyridinium chloride and methylsulfate
N-(3-methacrylamidopropyl)-N,N-dimethylamine
N-(3-methacrylamidopropyl)-N,N,N-trimethyl ammonium chloride
diallyl dimethyl ammonium chloride and methylsulfate.

The anionic hydrophilic monomers either are in their neutral form initially or are subsequently converted to their anionic form. These classes of compounds include polymerizable monomers which contain carboxy, sulfonate, or phosphate groups. Such monomers are represented by:
acrylic acid
methacrylic acid
sodium acrylate and methacrylate
vinylsulfonic acid
sodium vinylsulfonate
p-styrenesulfonic acid
sodium p-styrenesulfonate
2-methacryloyloxyethylsulfonic acid
3-methacryloyloxy-2-hydroxypropylsulfonic acid
2-acrylamide-methylpropanesulfonic acid
allylsulfonic acid
2-phosphatoethyl methacrylate.

Crosslinkers can be used in amounts of from 0.1 to 25 percent by weight of the polymeric mixture and can advantageously improve mechanical and dimensional stability properties of the contact lens materials of this invention. Useful crosslinking monomers include polyfunctional derivatives of acrylic acid, methacrylic acid, acrylamide, methacrylamide, and multi-vinyl substituted benzene.

Such crosslinking comonomers which modify the mechanical properties and dimensional stability include polyfunctional derivatives of acrylic acid, methacrylic acid, acrylamide, methacrylamide, and multi-vinyl substituted benzene, including but not limited to, the following:
neopentyl glycol diacrylate or methacrylate
ethylene glycol diacrylate or dimethacrylate
diethylene glycol diacrylate or dimethacrylate
tetraethylene glycol diacrylate or dimethacrylate
polyethylene glycol diacrylate or dimethacrylate
polypropylene glycol diacrylate or methacrylate
trimethylolpropane triacrylate or trimethacrylate
Bisphenol A diacrylate or dimethacrylate
ethoxylated Bisphenol A diacrylate or dimethacrylate
pentaerythritol tri- and tetraacrylate or methacrylate
tetramethylenediacrylate or dimethacrylate
methylene bisacrylamide or methacrylamide
dimethylene bisacrylamide or methacrylamide
diallyl diglycol carbonate
and cross linked polymerates of poly (organosiloxanes) alpha, omega, terminally bonded through a divalent hydrocarbon group to a polymerized activated unsaturated group as described in U.S. Pat. No. 4,780,515.

Latent crosslinking agents which are useful include:
glycidyl acrylate and methacrylate
allyl acrylate and methacrylate
N-methylolmethacrylamide
acrylic and methacrylic anhydride.

Permeability enhancers, such as siloxanes, silicon-containing ethers, fluorocarbons and the like can be added as known in the art.

Free radical initiaters can be those useful in the art; as for example, those chosen from those commonly utilized to polymerize vinyl-type monomers, including the following representative initiators:
2,2'-azo-bis-isobutyronitrile
4,4'-azo-bis-(4-cyanopentanoic acid)
t-butyl peroctoate
benzoyl peroxide
lauroyl peroxide
methyl ethyl ketone peroxide
diisopropyl peroxydicarbonate
2,2' azobisisovaleronitrile.

The free radical initiator is normally used in amounts of from 0.01 to 4 percent by weight of the entire composition.

Physical properties of the homopolymers and copolymers of this invention can be further modified by adding fluorine-containing materials for lubricity, aromatic materials to improve refractive index, and surface energy modifiers to obtain deposit resistence, as for example, fluorine materials.

Overall, the copolymers of this invention, most preferably, have a Rockwell R hardness of at least 100 (ASTMD-785), with a DK of 10 and, preferably, a DK of at least 20, although DK's of 30 and more are preferred and can be easily obtained using the method of this invention. The hardness value of homopolymers of the carboxylic esters of this invention is preferably Shore D of at least 70 and more preferably at least 80.

When the carboxylic acid esters are used substantially as a homopolymer, they make up at least 50% of the overall contact lens material in the preferred embodiments. And the modifiers are added in amounts within the preferred ranges as follows:
hardness agent, from 0 to 10% by weight of the total;
crosslinking agent, from 0 to 20% by weight of the total;
wettability enhancer, from 0 to 10% by weight of the total;
permeability enhancer, from 0 to 40% by weight of the total;
refractive index modifier, from 0 to 15% by weight of the total.

When used as an additive to conventional contact lens materials, the carboxylic acids of this invention which are devoid of beta hydrogens and are preferably used in amounts below 50% by weight of the entire composition.

Typical compositions where the esters may be used in ranges of 10 to 80% by weight of the entire compositions may be as follows:

Composition 1—A polymerized contact lens material formed by free radical polymerization of a wetting agent in an amount of from 1 to 10% by weight, a silicone methacylate in an amount of from 0 to 60%, a crosslinking agent in an amount of 0 to 30% and dineopentyl itaconate in an amount of 10 to 80%.

Composition 2—A polymerized contact lens material formed by free radical polymerization of a wetting agent 0–10% by weight, a crosslinking agent 0–30% by weight, a fluorinated itaconate 0–60% by weight, a silicone methacrylate 0–60% by weight, and dineopentyl itaconate 10–80% by weight.

Composition 3—A polymerized contact lens material formed by free radical polymerization of a wetting agent 0–10% by weight, dineopentyl itaconate 10–80% by weight, a fluoroalkyl methacrylate 0–60% by weight, a fluoroalkyl itaconate 0–60% by weight, and a crosslinking agent 0–30% by weight.

In all cases where the carboxylic esters of this invention are used with other contact lens monomers to form copolymers, the overall objective is to obtain a contact lens material which can be formed by conventional methods, i.e. for example, casting, molding or machining into contact lenses having desirable oxygen permeability, good machineability, dimensional stability, hardness, comfort to the eye, and wettability, with minimized deposit formation.

In general, the hardness value of pre-existing contact lens formulations can be increased by adding the carboxylic acid esters of this invention, while maintaining or increasing the oxygen permeability values.

The materials of this invention can be thermoplastic or thermosetting, thus providing latitude in the fabrication of contact lenses. Such materials can be polymerized directly in a suitable mold to form contact lenses. The thermoplastics can be converted directly into lenses by heat stamping, vacuum forming, pressure or injection molding and other conventional thermoplastic forming methods. In the case of hard or rigid gas permeable contact lenses, it is preferred to use conventional methods of forming contact lenses from the contact lens material of this invention. For example, the methods used for polymethyl methacrylate (PMA). In this approach, the formulations are polymerized directly into a sheet or rod and the contact lens blanks are cut as buttons, discs, or other pre-formed shapes from which they are then machined to obtain the lens surfaces. The polymeric blanks possess the optical qualities necessary to produce aberation-free, rigid gas permeable or hard contact lenses in accordance with this invention. Soft contact lens materials in accordance with this invention can be cast or formed into contact lenses by conventional methods.

Permeability (DK), as used in this specification, refers to a measurement on an instrument designed after ASTM D1434-wherein one side of the sample was subjected to pure oxygen at a pressure of 30 psi. Standard permeability samples in the form of wafers of a diameter of 12 mm and having a thickness of 0.50 mm–0.60 mm. The entire apparatus is maintained in a closed system, whereby the temperature is maintained at a constant 35° C. The oxygen that permeates through the wafer is allowed to expand on the other side of the sample against atmospheric pressure in a capillary tube plugged with a droplet of fluorocein solution. The displacement of the droplet is converted into distance of permeate per unit time. The instrument is standardized to known contact lens materials, as measured by Dr. I. Fatt.

The following examples are given to illustrate the invention and are not meant to be limiting. Into a 250 milliliter beaker with a one inch magnetic stirring bar is added 60 grams methyl methacrylate, 20 grams of N-vinylpyrrolidone, 10 grams of neopentyl glycol dimethacrylate, 10 grams of dineopentyl fumarate. To this is added 0.06 grams of Vaso 52 initiator, an azo initiator obtained from E.I. DuPont deNemours of Wilmington, Del., and 0.91 grams of Vaso 64 initiator, an Wilmington, Del. The sample is stirred at room temperature for 15 minutes. During this time, 0.004 grams of green dye Number 6 is added. The solution is stirred for a total of one-half hour. After this time, the solution is filtered into a silylated glass test tube. The solution is then degassed with nitrogen purging through the solution for 15 minutes. The tube is then capped and sealed and put into a water vat at 40° C. for 48 hours, followed by 65° C. in an oven for 24 hours, followed by 75° C. in a convection oven. The sample is cooled to room temperature, removed from the vial, and cut into buttons and/or wafers used to measure DK and hardness.

In the following examples, the steps of Example 1 were repeated, except that the temperature cycle was changed in certain examples as indicated below, as were the initiators. Thus, unless otherwise indicated, all dineopentyl itaconate examples were run under polymerization conditions: 65° C., 24 h; 3 h ramp; 85° C., 24 h; 3 h ramp; 115° C., 24 h with 0.5% Lupersol 256, a peroxide initiator obtained from Pennwalt, Buffalo, N.Y. and 0.5% tertiary butyl perbenzoate as initiators. Unless otherwise indicated, all methyl methacrylate and neopentyl methacrylate examples were run under these conditions: 40° C., 48 h; 65° C., 24 h; 75° C., 24 h with vaso 52 0.6 g and vaso 64 0.19 g as initiators. "h" indicates hours, "d" indicates a 24-hour day and "ramp" indicates even incremented temperature change over a given time. The difference in temperature cycle was minimal and was needed due to the reactivity of the methyl methacrylate at the higher temperatures.

EXAMPLE 2-3

| Example | 2 | 3 |
| MONOMER | % | % |
| --- | --- | --- |
| methyl methacrylate | XXX | 60 |
| dineopentyl itaconate | 60 | XXX |
| n vinyl pyrrolidone | 20 | 20 |
| neopentyl glycol dimethacrylate | 10 | 10 |
| dineopentyl fumarate | 10 | 10 |
| ROCKWELL R. HARDNESS | 125 | 124 |
| DK | 10 | 0.9 |

XXX - no additional monomer

These examples demonstrate that dineopentyl itaconate enhances permeability while retaining hardness. This also demonstrates that a fumarate may be employed as a comonomer. n vinyl pyrrolidone is used as a wetting agent and neopentyl glycol dimethacrylate as a crosslinking agent.

EXAMPLES 4-5

| Example | 4 | 5 |
| MONOMER | % | % |
| --- | --- | --- |
| dineopentyl itaconate | 40 | XXX |
| methyl methacrylate | 40 | 80 |
| n vinyl pyrrolidone | 10 | 10 |
| neopentyl glycol dimethacrylate | 10 | 10 |
| ROCKWELL R. HARDNESS | 118 | 123 |

| Example | 4 | 5 |
|---|---|---|
| MONOMER | % | % |
| DK | 1.5 | 0.95 |

XXX = no additional monomer.

The temperature cycle in Example 4 is as follows: 65° C., 24 h; 3 h ramp; 85° C., 24 h; 3 hr ramp; 115° C., 24 h.

These examples demonstrate that dineopentyl itaconate maintains permeability while substantially retaining hardness. This example demonstrates that methyl methacrylate can be copolymerized with the itaconate functionality. Again n vinyl pyrrolidone is used as a wetting agent and neopentyl glycol dimethacrylate as a crosslinking agent.

EXAMPLES 6-8

| Example | 6 | 7 | 8 |
|---|---|---|---|
| MONOMER | % | % | % |
| neopentylmethacrylate | XXX | XXX | 40 |
| methyl methacrylate | XXX | 40 | XXX |
| dineopentyl itaconate | 40 | XXX | XXX |
| bis hexafluoro isopropyl itaconate | 20 | 20 | 20 |
| hexafluoroisopropyl methacrylate | 20 | 20 | 20 |
| n vinyl pyrrolidone | 10 | 10 | 10 |
| a silicone dimethacrylate | 10 | 10 | 10 |
| ROCKWELL R. HARDNESS | 116 | 117 | 119 |
| DK | 54 | 7.4 | 38 |

XXX = no additional monomer

These examples demonstrate the dineopentyl itaconate dramatically increases permeability in combination with a silicon methacrylate and a fluoro itaconate and fluoro methacrylate while retaining hardness.

EXAMPLES 9-10

| Example | 9 | 10 |
|---|---|---|
| MONOMER | % | % |
| methyl methacrylate | XXX | 40 |
| dineopentyl itaconate | 40 | XXX |
| bis hexafluoro isopropyl itaconate | 20 | 20 |
| hexafluoroisopropyl methacrylate | 20 | 20 |
| neopentyl glycol dimethacrylate | 10 | 10 |
| n vinyl pyrrolidone | 10 | 10 |
| ROCKWELL R. HARDNESS | 122 | 124 |
| DK | 26 | 1.6 |

XXX = no additional monomer

These examples demonstrate that dineopentyl itaconate dramatically increases permeability in combination with a fluoro itaconate and a fluoro methacrylate while retaining hardness for machineability.

EXAMPLES 11-12

| Example | 11 | 12 |
|---|---|---|
| MONOMER | % | % |
| methyl methacrylate | XXX | 40 |
| dineopentyl itaconate | 40 | XXX |
| bis hexafluoro isopropyl itaconate | 20 | 20 |
| hexafluoroisopropyl methacrylate | 20 | 20 |
| neopentyl glycol dimethacrylate | 10 | 10 |
| t-butyl styrene | 10 | 10 |
| ROCKWELL R. HARDNESS | 122 | 124 |
| DK | 31 | 7.5 |

XXX - no additional monomer

These examples show that dineopentyl itaconate increases permeability in combination with a styrene group. Hardness is essentially unchanged. This is also in combination with fluoromers.

EXAMPLES 13-15

| Example | 13 | 14 | 15 |
|---|---|---|---|
| MONOMER | % | % | % |
| neopentylmethacrylate | XXX | XXX | 30 |
| methyl methacrylate | XXX | 30 | XXX |
| dineopentyl itaconate | 30 | XXX | XXX |
| methacrylic acid | 3.5 | 3.5 | 3.5 |
| n-vinyl pyrrolidone | 6.5 | 6.5 | 6.5 |
| neopentyl glycol dimethacrylate | 6.5 | 6.5 | 6.5 |
| tri fluoro ethyl itaconate | 28.5 | 28.5 | 28.5 |
| methacryloyloxypropyl tris (trimethylsilyl) siloxane | 25.0 | 25.0 | 25.0 |
| ROCKWELL R. HARDNESS | 121 | 120 | 119 |
| DK | 42 | 15 | 42 |

XXX = no additional monomer

These examples show that dineopentyl itaconate increases permeability in combination of a fluoro itaconate, a silicone methacrylate, n vinyl pyrrolidone as a wetting agent in combination with methacrylic acid, and a crosslinking agent, neopentyl glycol dimethacrylate. This demonstrates that there is no loss in hardness.

EXAMPLE 16

| | % by Weight |
|---|---|
| dineopentyl itaconate | 53.0 |
| methacrylic acid | 4.0 |
| vaso 64 | 0.13 |
| vaso 52 | 0.05 |
| n-vinyl pyrrolidone | 2.00 |
| methacryloyloxypropyl tris (trimethylsilyl) siloxane | 37.00 |
| tetraethylene glycol dimethacrylate | 4.00 |
| The temperature cycle is changed as follows: 40° C., 72 h; 65° C., 48 h; 75° C., 24 h | |
| HARDNESS | 113 |
| DK | 55 |

EXAMPLE 17

| | % by Weight |
|---|---|
| n vinyl pyrrolidone | 25 |
| neopentylmethacrylate | 25 |
| allyl methacrylate | 0.2 |
| ethylene glycol dimethacrylate | 0.1 |
| hydroxyethyl methacrylate | 50 |
| vaso 52 | 0.1 |
| vaso 64 | 0.25 |
| The Temperature cycle is as follows: 40 C., 2 d; 65 C, 1 d, 75 C, 1 d | |
| HARDNESS | 122 |
| DK at percent hydration of 26.8% | 13.5 |

This example illustrates preparation of neopentylfumarate (bis-2,2-dimethylpropyl fumarate).

Into a 3 necked 1000 mL round-bottomed flask equipped with a Dean-Stark trap and a reflux condenser, was placed 130.4 g (1.26 mol) fumaric acid, 6.0 g p-toluenesulfonic acid monohydrate, 250 g-neopentyl alcohol (2.8 mol), and 450 mL toluene. The mixture was heated at reflux for 10 h which afforded a clear slightly yellow solution (40 mL water collected). The solution was cooled to room temperature and was transferred into a separatory funnel. The solution was washed with 2×200 mL aqueous saturated NaHCO$_3$ solution, 2×200 mL distilled water, 1×200 mL aqueous saturated NaCl solution. The organic solution was dried (MgSO$_4$), vacuum filtered through a course-medium glass frit, and concentrated at reduced pressure [rotary evaporator, water bath 50° C., aspirator pressure followed by vacuum pump (0.5–1.0 mm Hg for 0.5 h or until all volatiles are removed)] (This is determined by constant weight of material in flask) to afford 286 g (98.5%) of a white crystalline material. Mp 55°–56° C.

EXAMPLE 19

Neopentylmethacrylate is homopolymerized using the following temperature cycle and formulation.

|  | % by Weight |
| --- | --- |
| neopentylmethacrylate | 100 |
| Lupersol 256 | 0.3 |
| Cycle: 40 C, 24 h; 65 C, 24 h | |
| HARDNESS | 121 |
| DK | 21 |

A usable contact lens material is obtained.

While Shore D hardness values of at least 70 have been recited for homopolymers in some cases they need be extrapolated. Vickers hardness values for homopolymers are preferably above 9 at a 200 gram load with polymethyl methacrylates having a hardness of 23.18

While specific examples of the invention have been shown and described, it will be obvious to those skilled in the art that many variations are possible.

We claim:

1. A contact lens material which is the polymerization product of a mixture comprising neopentyl methacrylate.

2. The contact lens material of claim 1, wherein the mixture further comprises at least one member selected from the group consisting of a fluorine-containing acrylate, a fluorine-containing methacrylate, and a fluorine-containing itaconate.

3. The contact lens material of claim 2, wherein the mixture includes at least one member selected from the group consisting of hexafluoroisopropyl methacrylate, bis(hexafluoroisopropyl) itaconate, and trifluoroethyl itaconate.

4. The contact lens material of claim 3, wherein the mixture includes bis(hexafluoroisopropyl) itaconate.

5. The contact lens material of claim 4, wherein the mixture further comprises a crosslinking agent.

6. The contact lens material of claim 5, wherein the crosslinking agent is at least one member selected from the group consisting of neopentyl glycol diacrylate, neopentyl glycol dimethacrylate, ethylene glycol diacrylate, ethylene glycol dimethacrylate, tetraethylene glycol diacrylate and tetraethylene glycol dimethacrylate.

7. The contact lens material of claim 2, wherein the mixture further comprises a crosslinking agent.

8. The contact lens material of claim 7, wherein the crosslinking agent is at least one member selected from the group consisting of neopentyl glycol diacrylate, neopentyl glycol dimethacrylate, ethylene glycol diacrylate, ethylene glycol dimethacrylate, tetraethylene glycol diacrylate and tetraethylene glycol dimethacrylate.

9. A contact lens which is formed from the polymerization product of a mixture comprising neopentyl methacrylate.

10. The contact lens of claim 9, wherein the mixture further comprises at least one member selected from the group consisting of a fluorine-containing acrylate, a fluorine-containing methacrylate, and a fluorine-containing itaconate.

11. The contact lens of claim 10, wherein the mixture includes at least one member selected from the group consisting of hexafluoroisopropyl methacrylate, bis(hexafluoroisopropyl) itaconate, and trifluoroethyl itaconate.

12. The contact lens of claim 11, wherein the mixture includes bis(hexafluoroisopropyl) itaconate.

13. The contact lens of claim 12, wherein the mixture further comprises a crosslinking agent.

14. The contact lens of claim 13, wherein the crosslinking agent is at least one member selected from the group consisting of neopentyl glycol diacrylate, neopentyl glycol dimethacrylate, ethylene glycol diacrylate, ethylene glycol dimethacrylate, tetraethylene glycol diacrylate and tetraethylene glycol dimethacrylate.

15. The contact lens of claim 10, wherein the mixture further comprises a crosslinking agent.

16. The contact lens of claim 15, wherein the crosslinking agent is at least one member selected from the group consisting of neopentyl glycol diacrylate, neopentyl glycol dimethacrylate, ethylene glycol diacrylate, ethylene glycol dimethacrylate, tetraethylene glycol diacrylate and tetraethylene glycol dimethacrylate.

* * * * *

UNITED STATES PATENT AND TRADEMARK OFFICE
CERTIFICATE OF CORRECTION

PATENT NO. : 5,346,978
DATED : September 13, 1994
INVENTOR(S) : Richard C. Baron, et. al.

It is certified that error appears in the above-indentified patent and that said Letters Patent is hereby corrected as shown below:

In column 2, line 35, delete "p1".

In column 14, line 2, delete "Into a 250" and insert the following:

-- EXAMPLE 1

Into a 250 --

Signed and Sealed this

Twenty-fourth Day of January, 1995

Attest:

BRUCE LEHMAN

Attesting Officer    Commissioner of Patents and Trademarks